United States Patent Office 3,503,956
Patented Mar. 31, 1970

3,503,956
NEUTRALIZATION AND STABILIZATION TREATMENT OF WATER-SOLUBLE CELLULOSICS
Martin Eugene Rowley and Walter Dieter Slowig, Rochester, N.Y., assignors to Eastman Kodak Company, Rochester, N.Y., a corporation of New Jersey
No Drawing. Filed Dec. 21, 1967, Ser. No. 692,286
Int. Cl. C08b 3/22, 3/30
U.S. Cl. 260—215
10 Claims

ABSTRACT OF THE DISCLOSURE

The hazardous and costly organic solvent washing deacidification steps required in the conventional production of water-soluble cellulosics (for example, monovalent metal cellulose acylate sulfates) are eliminated by treating water-soluble cellulosics with ammonia or a gaseous amine in order to eliminate the residual acidity present in the product and stabilize the cellulosic material against decomposition.

The present invention relates to the treatment of water-soluble cellulosics and more particularly to a neutralization and stabilization treatment for freshly prepared monovalent metal cellulose acylate sulfates.

A variety of methods have been described in the prior art for preparing water-soluble cellulosics (i.e., esters of cellulose containing more than about 6 percent by weight of sulfur) and more particularly water-soluble monovalent metal cellulose acylate sulfates. These include the methods of U.S. Patents No. 1,866,532 of Haskins, 2,582,009 and 2,622,079 to Crane, 3,075,962 and 3,075,963 to Hiatt and Rowley, and 3,075,964 to Malm and Rowley. Although the reagents and conditions described in the above-patented preparations vary considerably, there is one step of the preparation which remains constant in all of these disclosures. This is the step which calls for washing the freshly prepared product with large amounts of an organic solvent such as isopropanol or acetone in order to remove substantially all traces of residual unreacted acids which might cause degradation of the product.

This washing step is often one of the most hazardous and costly of the entire manufacturing operation due to the inflammable and explosive nature of the washing solvents and the extensive equipment and careful handling procedures which must be used to protect against the same.

It is, therefore, the object of the present invention to eliminate the expensive and hazardous washing steps which have formed a requisite portion of the prior art methods for the preparation of water-soluble cellulosics and in particular monovalent metal cellulose acylate sulfates.

It has been discovered that the organic solvent washing steps of the prior art water-soluble cellulosic preparations can be replaced by a technique which calls for contacting the cellulosic for a short time with ammonia or a gaseous amine.

The present invention provides a treatment for freshly and heterogeneously (i.e., without dissolution of the cellulose ester) prepared water-soluble cellulosics and in particular monovalent metal cellulose acylate sulfates, which treatment comprises exposing the freshly prepared, somewhat acidic cellulosic material to an atmosphere comprising at least about 25 volume percent of ammonia or a gaseous amine (or mixture thereof) for a period of time sufficient to neutralize at least a major proportion and preferably at least about 50% of the residual acids which are present within the fibrous product mass.

According to a preferred embodiment, the invention provides for drying a monovalent metal cellulose acylate sulfate prepared according to any conventional heterogeneous reaction technique, preferably in a vacuum, to effect preliminary removal of harmful residual acids and subsequently causing the drying chamber to return to atmospheric pressure by admitting ammonia or a gaseous amine such as methylamine or ethylamine into the chamber which can but need not be heated until at least about 50 percent and preferably substantially all of the residual acidity has been neutralized.

Although the optimum cellulosic product is one from which substantially all of the residual acidity has been eliminated and, hence, one which possesses a very high degree of stability, some improvement in the stability of the product can be obtained if at least about half of the acidic materials are neutralized during the practice of this invention. Thus, although it is preferred to treat the cellulosic according to the process of this invention for a period of time sufficient to insure neutralization of substantially all of the residual acidity, the product may be removed from the treatment prior to the time when this stage is reached and a useful product having only a portion of its residual acidity eliminated via the present process obtained. Generally, however, it is preferred that practically all of such residual acidity be eliminated in the optimum practice of this invention.

One of the preferred classes of materials for treatment in accordance with the present processes consists of the monovalent metal cellulose acetate sulfates which are generally prepared commercially by treating fibrous cellulose as a slurry with acetylsulfuric acid (partially as the sodium salt) in acetic acid-acetic anhydride. At the completion of the reaction, the fibrous product is separated from the sulfating-acetylating bath and slurried in a solution consisting of a neutralizing agent (described in detail below), a stabilizing agent (also described below), a small amount of water and acetic acid. The fibrous product is then separated by filtration and the product dried in a vacuum to remove as much acetic acid as possible. Not all acetic acid will be removed in this fashion, but a small amount of from about 1 to about 5 percent (based on the product) whose quantity can be determined by titration with any conventional base such as sodium hydroxide will remain. It is at this point that the treatment according to the present invention is applied. The cellulosic product can be treated with ammonia or a gaseous amine by, for example, permitting the ammonia or amine to leak into the vacuum drying chamber until atmospheric pressure is attained, thus providing an ammonia or amine atmosphere of substantially 90–100 percent by volume when the vacuum chamber is essentially evacuated prior to admission of the ammonia or amine. During the time the ammonia or amine is leaking into the vacuum chamber, the product is being rendered heat stable, as the ammonia or amine neutralizes the small amounts of residual (in this instance acetic) acid. The product can then be heated, if desired, to drive off any excess ammonia or amine which may remain in the fibrous product.

Alternatively, treatment of the cellulosic product with the ammonia or amine can be carried out in a number of ways. For example, the cellulosic material can be removed from the drying chamber and the ammonia or gaseous amine passed therethrough at the required concentration in either another chamber which is at atmospheric pressure, or in an open apparatus fitted with the proper equipment such as an exhaust fan to prevent dispersion of the gas into the air and to provide a means for recovering the unreacted amine for recirculation. If desired, the cellulosic material may be dampened with either water or an organic solvent such as acetone prior to treatment with ammonia or the amine, as this may in some instances by diluting or dissolving the materials such as the residual acids and salts which impart the residual acidity to the cellulosic hasten the neutralization reaction with the ammonia or amine. If water is used as the dampening agent, however, care should be taken to use no more than about 10% by weight thereof due to solubility of the product being treated in water.

Furthermore, it is not critical that the cellulosic material be dried (as described above) prior to treatment with the amine according to the processes of this invention. However, if the cellulosic product is not dried, prior to treatment, a substantially larger amount of the ammonia or amine will be needed to neutralize the larger amounts of residual acid material which will be present due to a lack of a preliminary removal by drying.

If the cellulosic is dried by heating in air, the ammonia or amine atmosphere can be produced by either passing the ammonia or amine through the fibrous product mass or placing the product in a closed container and pumping the ammonia or gaseous amine therein. In any case, a sufficient amount of ammonia or the amine must be brought into contact with the mass to insure that at least about 50% of the residual acid is neutralized to provide the type of a useable product generally desired. As a practical matter, the concentration of ammonia or the gaseous amine around the cellulosic fibers must be such as to provide an atmosphere of at least about 25% by volume of ammonia or the amine in order to provide the necessary minimal desired effects described above.

The concentration of ammonia or the amine in the vacuum chamber or in the atmosphere which contacts the cellulosic if such a chamber is not used may range broadly depending upon the amount of time which is available for neutralization of the residual acid as well as the amount thereof which is present in the fibrous product and the percentage of the acid which it is sought to remove. As stated above, the concentration of ammonia or the amine should be at least about 25 volume percent and, preferably, the concentration thereof within and about the product should approach 100 volume percent to insure rapid and complete neutralization of the residual acidity to obtain the preferred substantially acid-free product.

The cellulosic and the preferred monovalent metal cellulose acylate sulfates may be prepared according to any of the heterogeneous reaction methods set forth in the above-mentioned patents or, for that matter, almost any of the conventional heterogeneous prior art procedures. Once the desired salt is obtained from the heterogeneous reaction, the fibers are separated from the liquid phase of the reaction mixture and the same dried, preferably by heating to about 150° F. in a vacuum or simply leaving them at room temperature (about 70° F.) in the vacuum, in order to remove as much of the residual acid reagent as possible. Although the heating and the application of the vacuum are not strictly necessary, they hasten evaporation and removal of the acid and, hence, are preferred as a preliminary preparatory step.

The actual amount of time required to neutralize a significant amount of free acid in such cellulosic materials is not critical and can, in fact, vary considerably depending upon such factors as the concentration of ammonia or amine in the atmosphere with which the cellulosic product is contacted, the temperature during the contacting period, the physical orientation of the cellulosic material (i.e., whether it is "fluffy" or very tightly packed), and even the particular amine that is utilized. However, as a general rule, the period of time during which the ammonia or gaseous amine is held in physical contact with the acidic cellulosic material is at least about 1 second. Contact periods of from about 5 minutes to about 10 hours will generally be adequate to treat any of the cellulosics intended for treatment in accordance with the processes of this invention. In one of the preferred embodiments of the present invention where, for example, a mixture of air and ammonia (about 90–100 volume percent ammonia) is forced into a chamber containing a bed or layer of dried, somewhat acidic cellulose acetate sulfate, optimum contact time is within the range of from about 2 to about 5 hours (the temperature of the gas and cellulosic material being about 120° F.). This range is typical of the preferred practice of the present processes.

The monovalent metal cellulose acylate sulfates which are the preferred subjects of this treatment include the salts of lithium, potassium and, according to the preferred embodiment set forth in the examples below, sodium. The acylate portion of the salt may be the acetate, propionate, butyrate or mixtures thereof, whose composition depends upon the method of preparation and the reagents utilized.

Any primary, secondary or tertiary amine having a boiling point below about 250° F. can be used in the process of this invention, although those boiling above 150° F. should preferably be utilized under vacuum conditions such as those described below.

Some of the particular amines which are suitable for use in the present invention include: alkyl amines such as ethylamine, methylamine, isopropylamine, tert-butylamine, n-propylamine, isobutylamine, n-butylamine, ethylenamine, ethylmethylamine, dimethylamine, diethylamine, methylisopropylamine, sec-butylamine, trimethylamine, ethylpropylamine and di-isopropylamine, cycloalkyl amines such as cyclopropylamine, cyclobutylamine, pyrrolidine, N-methylpyrrolidine and 2,4-dimethylpyrrolidine and aryl amines such as piperidine. All of the above either boil below room temperature or if they boil above room temperature, may also be used in the treatment of this invention by heating them to their boiling point prior to admitting them to a vacuum treating chamber or bed, the latter chamber or bed being maintained at or above the boiling point of ammonia or the amine but below the recommended 120–150° F. drying temperature for the salt. Alternatively, ammonia or the amine can be allowed to boil into a treating chamber which can, but need not, be at reduced pressure. When an amine is used, it should have a boiling point such that conversion into a gaseous form does not require heating of the cellulosic to a temperature above the 120–150° F. range suggested as an optimum drying temperature range. All of the above-mentioned amines boil below the recommended 150° F. maximum drying temperature at atmospheric pressure, or will boil at temperatures within that range under the vacuum conditions which can prevail within the confines of the preferred vacuum drying chamber which is maintained at a maximum pressure of 100 mm./mercury. It should be clear that the higher boiling amines can be used when the vacuum drying and treating method are used, as under such reduced pressure even amines with normal boiling points substantially above the recommended drying temperature range (below about 250° F.) will boil within the suggested range. Further preferred for optimum results and treatment simplification are those compounds such as ammonia, ethylamine and methylamine which boil below room temperature and, hence, do not require heating of or application of a vacuum to the cellulosic material to obtain neutralization according to the processes of the present invention.

As stated above, the preferred subjects for treatment in accordance with the processes of this invention are the monovalent metal cellulose acylate sulfates which can be prepared by treating fibrous cellulose as a slurry with acetylsulfuric acid (partially as the sodium salt) in acetic acid-acetic anhydride. At the completion of the reaction which requires about 2 hours the fibrous product is separated from the sulfating-acetylating bath by filtration and slurried in a solution consisting of a neutralizing agent such as sodium acetate, potassium acetate, sodium hydroxide, potassium hydroxide, sodium carbonate or some other alkali base or basic salt, a stabilizing agent such as urea, a small amount of water and acetic acid. The neutralizing agent reacts to neutralize any free sulfuric acid which may still be present after the sulfonation reaction, while the stabilizing agent provides a ready source of base ($NH_3$) to neutralize any degrading acid which may be formed during storage of the cellulosic.

According to the preferred embodiment, the fibrous alkali cellulose acetate sulfate is then separated by filtration, heated to from about 120 to about 150° F. in a vacuum of from about 10 to about 100 mm./Hg for from about 15 to about 120 minutes in order to accomplish preliminary removal of residual acetic acid which is present in the fibrous product as described above.

As a matter of fact, insofar as the successful practice of the present invention is concerned, the particular manipulative procedures (including the concentration and types of the various reactants) utilized in producing the cellulosic material are not important so long as water-soluble cellulosic materials such as those described herein are produced thereby.

At the end of this time, the heat is removed from the drying chamber and ammonia can be admitted until atmospheric pressure is reached. In this manner a substantially 100 percent ammonia atmosphere is produced in the vicinity of the fibrous mass. Exposure of the product to this atmosphere for maximum stabilization should range from about 5 minutes to about 10 hours depending upon the physical form of the product (i.e., "fluffy" or closely packed) and the other variables described above. The product is then removed from the drying chamber.

The excess ammonia which may be present in the fibrous product at this point is easily removed by heating the product to about 120° F. for from about 5 minutes to up to several hours.

The present processes apparently do not interfere with the function of other materials that are sometimes added to the various cellulosic materials which can be treated in the manner disclosed herein. For example, small amounts of urea can be used in accordance with conventional stabilizing techniques prior or subsequent to treatment according to the method disclosed herein without detracting from the excellent result that can be obtained by practicing this invention.

The following examples will serve to better illustrate our invention:

EXAMPLE 1

An acetylation grade pulp is water activated and dewatered with acetic acid. Fifty parts of this pulp (containing 46.7 parts of acetic acid) are added to 1,700 parts of acetic acid and the slurry cooled to 62° F.

The sulfating mixture is prepared by adding 51.6 parts of 95% sulfuric acid to a slurry of 71 parts of sodium sulfate in 625 and 129 parts of acetic anhydride and acetic acid respectively. This solution is cooled, 12.3 parts of 95% sulfuric acid added and the final mixture cooled to 32° F.

The sulfating mixture is added to the slowly stirred slurry of pulp in acetic acid and allowed to react for 2 hours (no external cooling required). The mixture comes to room temperature by the end of the reaction. The fibrous product is collected in a suction funnel which gives a filter cake containing about 3 parts liquid. The cake is then slurried in a solution containing 25 parts sodium acetate, 20 parts urea, 125 parts water in 2,375 parts acetic acid. After standing in the wash solution for about 18 hours, the product is again collected on a suction funnel and finally dried at 140° F. under a 20 mm./Hg vacuum. After vacuum drying, ammonia gas is allowed to leak into the drying chamber until atmospheric pressure is achieved. The product is then removed from the vacuum chamber and subsequently heated in a 120° F. oven for about 5 hours to discharge any excess ammonia in the product.

The product is stable to 160° C. for about 24 hours and completely water-soluble.

Analyses for the sulfate ester are:

| | Percent |
|---|---|
| Total sulfur | 11.7 |
| Free sulfur ($Na_2SO_4$) | 2.6 |
| Acetyl | 16.4 |
| Ash | 30.5 |
| Nitrogen | 1.6 |

EXAMPLE 2

In a 12,000 ml. flask was placed 193.4 g. of pulp (wet with acetic acid, 100 g. when dry) and 3,400 grams of acetic acid. 24.6 g. sulfuric acid (95%) in 200 g. acetic acid were then added to the above mixture and agitated at 25° C. for 1 hour.

The purpose of the sulfuric acid addition is to degrade the pulp in order to obtain a final product which has a lower viscosity.

The following sulfation mixture is added and reacted at 25° C. for 2 hours:

Sulfation mixture

| | G. |
|---|---|
| $Na_2SO_4$ | 142 |
| $Ac_2O$ | 1250 |
| $HOAc$ | 258 |
| $H_2SO_4$ (95%) | 103.2 |

The liquid is removed with suction and the damp product is then kept in the following solution for several hours:

| | G. |
|---|---|
| Acetic acid | 3800 |
| $H_2O$ | 200 |
| NaOAc | 50 |
| Urea | 40 |

The liquid is suctioned off and the product dried overnight at 60–70 C. under vacuum. It is then dried 2 days at 50° C. in a recirculating air oven to eliminate residual acetic acid.

The product is then placed in an essentially 100% ammonia atmosphere for several hours.

The excess ammonia is eliminated by placing the product in a 50° C. recirculating oven overnight.

The product is stable for 23 hours at 160° C.

| | Percent |
|---|---|
| Acetyl | 13.9 |
| Ash | 28.4 |
| Nitrogen | 2.4 |
| Total sulfur | 11.2 |
| Free sulfur | 2.0 |

EXAMPLE 3

In a 12,000 ml. flask was placed 193.4 grams of pulp with acetic acid (100 g. dry) and 3,400 grams of acetic acid.

The following sulfation mixture was cooled to 0° C. and added with agitation:

| | G. |
|---|---|
| $Na_2SO_4$ | 142 |
| $Ac_2O$ (acetic anhydride) | 1250 |
| HOAc (acetic acid) | 258 |
| $H_2SO_4$ (90%) | 127.8 |

The heterogeneous mixture was allowed to react at 25° C. for 2 hours and the liquid removed with suction.

The damp product is then placed in the following solution for 5 hours:

| | G. |
|---|---|
| Acetic acid | 3800 |
| H₂O | 200 |
| NaOAc | 50 |
| Urea | 40 |

The liquid is suctioned off and the product dried over night at 60°–70° C. under vacuum. It is then dried for 48 hours in air at 50° C. to eliminate residual acetic acid. The product is then placed in an essentially 100% ammonia atmosphere for several hours.

The ammonia is eliminated by placing the product in 50° C. air for 16 hours.

Product is stable at 160° C. for 20 hours.

| | Percent |
|---|---|
| Ash | 31.1 |
| Free sulfur | 3.0 |
| Acetyl | 16.9 |
| Total sulfur | 11.5 |

The invention has been described in detail with particular reference to preferred embodiments thereof, but it will be understood that variations and modifications can be effected within the spirit and scope of the invention as described hereinabove and as defined in the appended claims.

We claim:

1. A method of treating a water-soluble cellulose ester containing acidic residues to reduce its residual acidity and thereby stabilize it against decomposition, said method comprising the step of contacting said cellulose ester with a gaseous atmosphere comprising at least about 25 volume percent of ammonia or a gaseous amine having a boiling point below about 250° F. for a period of time sufficient to neutralize at least about half of the residual acidity of said cellulose ester.

2. The method as described in claim 1 wherein said cellulose ester is a monovalent metal cellulose acylate sulfate.

3. The method as described in claim 1 wherein said cellulose ester is sodium cellulose acetate sulfate.

4. The method as described in claim 1 wherein said atmosphere consists essentially entirely of ammonia or said gaseous amine and substantially all of said residual acidity is neutralized.

5. The method as described in claim 1 wherein said amine is a member selected from the group consisting of ethylamine, methylamine, isopropylamine, tert-butylamine, n-propylamine, isobutylamine, n-butylamine, ethylenamine, ethylmethylamine, dimethylamine, diethylamine, methylisopropylamine, sec-butylamine, trimethylamine, ethylpropylamine, di-isopropylamine, cyclopropylamine, cyclobutylamine, pyrrolidine, N-methylpyrrolidine, 2,4-dimethylpyrrolidine, piperidine, and mixtures thereof.

6. The method as described in claim 1 wherein said gaseous atmosphere comprises at least about 25 volume percent of ammonia.

7. The method as described in claim 1 wherein contact of said cellulose ester and ammonia or said amine is effected at a temperature of about 70° F. to about 150° F. for a period of at least about one second.

8. The method as described in claim 2 wherein said cellulose acylate sulfate is enclosed in a vacuum chamber at a pressure of below about 100 millimeters of mercury, ammonia or said gaseous amine is introduced into said chamber until atmospheric pressure is reached, and said cellulose acylate sulfate is heated for a period of from about 5 minutes to about 10 hours.

9. The method as described in claim 8 wherein said cellulose acylate sulfate is dried at a temperature of from about 70° F. to about 150° F. and a pressure of below about 100 millimeters of mercury prior to being contacted with ammonia or said gaseous amine.

10. The method as described in claim 9 wherein said cellulose ester is sodium cellulose acetate sulfate.

References Cited

UNITED STATES PATENTS

| | | | |
|---|---|---|---|
| 2,036,423 | 4/1936 | Malm et al. | 260—215 |
| 2,241,226 | 5/1941 | Malm et al | 260—230 |
| 2,348,305 | 5/1944 | Olpin et al. | 260—230 |
| 2,849,439 | 8/1958 | Steinmann | 260—230 |
| 2,980,491 | 4/1961 | Segal et al. | 260—227 |
| 3,000,876 | 9/1961 | Touey et al. | 260—215 |
| 3,075,964 | 1/1963 | Malm et al. | 260—215 |

DONALD E. CZAJA, Primary Examiner

R. W. GRIFFIN, Assistant Examiner

U.S. Cl. X.R.

106—186; 260—230